United States Patent [19]

Pierce, Jr. et al.

[11] 3,755,225

[45] Aug. 28, 1973

[54] PROCESS FOR PREPARING HOMO- AND COPOLYMERS OF VINYL CHLORIDE IN AQUEOUS EMULSION WITH POST ADDITION OF A WATER-SOLUBLE ETHYLENE OXIDE-ETHYLENE GLYCOL ADDUCT

[75] Inventors: John K. Pierce, Jr., Baytown, Tex.; Libardo Toro, Rio Piedras, P.R.

[73] Assignee: Diamond Shamrock Corporation, Cleveland, Ohio

[22] Filed: Aug. 17, 1971

[21] Appl. No.: 172,558

Related U.S. Application Data

[63] Continuation-in-part of Ser. No. 878,222, Nov. 19, 1969, abandoned.

[52] U.S. Cl. 260/23 EM, 260/23 XA, 260/29.6 PM, 260/92.8 W, 260/92.8 A
[51] Int. Cl. ............................................. C08f 3/28
[58] Field of Search .................. 260/23 EM, 23 XA, 260/29.6 PM, 92.8 W, 92.8 A

[56] References Cited
UNITED STATES PATENTS

| | | | |
|---|---|---|---|
| 3,642,740 | 2/1972 | Pierce | 260/92.8 X |
| 2,673,192 | 3/1954 | Hill | 260/92.8 X |

OTHER PUBLICATIONS

Smith, "Vinyl Resins" pages 96, 97 (1958).

Primary Examiner—Donald E. Czaja
Assistant Examiner—Eugene C. Rzucidlo
Attorney—Roy Davis, Helen P. Brush et al.

[57] ABSTRACT

An aqueous emulsion polymerization process is described for the preparation of vinyl chloride homo- and copolymers which find particular utility as molding resins wherein the emulsifier system comprises, in combination, from 0.05 percent to 3 percent of an alkali metal salt of a sulfated fatty alcohol having from 8–18 C atoms per molecule; and from 0.05 percent to 2 percent of either tallow fatty alcohol or an epoxidized oil of an unsaturated fatty acid, the percentage of each ingredient being based on the weight of the monomer. After the polymerization reaction is substantially completed but prior to spray-drying of the polymerization mixture, there is blended into said mixture from 0.05 percent to 3 percent, by weight of the initial monomer charge, of an ethylene oxide adduct of ethylene glycol having a molecular weight ranging up to about 600. Plastisols of the resin products exhibit excellent dispersion rheologies and air-release properties. Moldings prepared from these resins may, in many instances, be utilized in contact with foodstuffs.

8 Claims, No Drawings

PROCESS FOR PREPARING HOMO- AND COPOLYMERS OF VINYL CHLORIDE IN AQUEOUS EMULSION WITH POST ADDITION OF A WATER-SOLUBLE ETHYLENE OXIDE-ETHYLENE GLYCOL ADDUCT

This application is a continuation-in-part of our copending application, Ser. No. 878,222, filed Nov. 19, 1969, and now abandoned.

BACKGROUND OF THE INVENTION

The present invention relates to improvements in the aqueous emulsion polymerization of ethylenically unsaturated monomers, especially vinyl chloride, either alone, or in admixture with other unsaturated monomers polymerizable therewith. More particularly, this invention relates to improvements in the production of vinyl polymers known as paste resins. Still more particularly, it relates to the production of vinyl chloride paste resins having particular utility for the fabrication of various plastic molded articles of excellent quality.

In order to simplify the presentation of the invention, it is desired to dispense with the use of terms such as "copolymers," "interpolymers," "terpolymers," "copolymerization," and the like. Accordingly, it is to be understood that, where the words "polymer," "polymeric," "polymerization," etc., are used, these words are to be understood to extend to and and include processes and products wherein more than one monomer is employed in a polymerization reaction to form a copolymer, terpolymer, etc. For example, these terms are intended to include processes and products that employ as little as 50 percent vinyl chloride, with the remainder being one or more additional monomers to form interpolymers, including copolymers and terpolymers.

Moreover, it is likewise to be understood that, as used in the specification and claims, the term "paste resin" is intended to mean the particulate dry polymer product which is obtained by finishing, as hereinafter described, an aqueous emulsion of said polymer previously prepared in an aqueous emulsion polymerization process. A paste resin so obtained may also be designated by such terms as "emulsion resin," "plastisol resin," "dispersion resin," and the like.

The art of preparing dispersions of various synthetic resins by the direct polymerization of polymerizable monomeric materials, for example, vinyl chloride, and mixtures thereof, with other polymerizable monomeric materials, in aqueous emulsion in the presence of an emulsifying agent, is well known. The resulting polymerization mass is in the form of a synthetic latex, from which, in the production of paste resins, the polymer is obtained in powder form by precipitation or by other suitable means, such as spray-drying. The dry resin powder may then be incorporated, with stirring, into a liquid organic material which is a plasticizer for the resin. The paste-like polymer dispersion so formed is known as a plastisol. Upon heating this dispersion to an elevated temperature, solvation of the polymer particles by the plasticizer occurs, followed by polymer fusion. When the fused polymer mass is subsequently cooled, a substantially homogeneous body of plasticized synthetic resin is obtained.

Depending upon its particular physical properties, which, in turn, significantly affect its processing characteristics, a plastisol of a vinyl chloride homo- or copolymer may be employed in various processing operations as, for example, extrusion, molding, dip-coating, spread-coating, and the like, to produce tough, durable coatings or comparable molded articles. To perform satisfactorily in molding operations, a plastisol and the vinyl chloride paste resin therein should possess a number of physical characteristics which are extremely important and desirable. Specifically, these properties include, among others, stability of the resin against degradation at elevated temperatures; negligible moisture-sensitivity of the resin; excellent rheology of the plastisol at both low and high shearing stress; and stability of the plastisol in the sense that it does not increase excessively in viscosity at room temperature within a reasonable period of time. It is essential that the plastisol exhibit excellent air-release characteristics so that air entrapped during the preparation thereof may be easily removed prior to molding operations. In many instances, it is also desirable that the molded products which are obtained exhibit a high surface gloss. Of course, it is possible to regulate these properties to some degree in the paste resin product by employing appropriate techniques in the polymerization reaction. However, it has not been possible heretofore to produce, without considerable difficulty, paste resins from which plastisols could be prepared affording all of these several characteristics to the desired degree and at the same time.

In an aqueous emulsion polymerization process, important constituents of the polymerization mixture, aside from the monomer or monomers, including the initiator employed to initiate and propagate the polymerization reaction and the emulsifier or emulsifier mixture incorporated to prevent flocculation of the polymer. In general, a Redox initiator system is used. This system is well known and may be found described in many U.S. patents as well as numerous publications.

The other important constituent of the polymerization mixture in an aqueous emulsion polymerization process is the surfactant or emulsifier which serves to prevent flocculation of the polymer as it is formed. Many different classes and types of such materials have been employed heretofore in emulsion polymerization processes in combination with the Redox catalyst systems. However, the paste resin products so produced have not exhibited all of the properties desired for successful molding application.

SUMMARY OF THE INVENTION

We have now found that a vinyl chloride paste resin product adaptable for molding applications can be prepared by utilizing a specific emulsifier system in the polymerization formulation, and thereafter adding to the polymerization mixture after polymerization is substantially completed but prior to spray-drying of the mixture, certain completely water-soluble, self-dispersing ethylene oxide adducts of ethylene glycol of controlled molecular weight. The resulting particulate resin product, of excellent clarity and negligible sensitivity to moisture, possesses excellent air-release properties and dispersion viscosity characteristics, properties found essential for successful application in molding operations.

Accordingly, the present invention is directed to a process for preparing paste resins from vinyl chloride monomer, or from a monomer mixture containing at least 50 percent, by weight, of vinyl chloride, which process comprises polymerizing said monomer or monomer mixture in an aqueous medium at a temperature ranging between 100° and 160° F, in the presence of a free radical-generating initiator, and, as the emulsifier, a combination of (1) an alkali metal salt of a sulfated fatty alcohol of 8–18 C atoms as the primary surfactant; and (2) either a tallow fatty alcohol or an epoxidized oil of an unsaturated fatty acid as a secondary surfactant. The water-soluble ethylene oxide adduct of ethylene glycol, e.g., diethylene glycol, triethylene glycol or polyethylene glycols of lower molecular weight is added to the polymerization mixture just prior to the spray-drying thereof, to obtain particulate polymer.

DESCRIPTION OF THE PREFERRED EMBODIMENTS

As previously described herein, the process of this invention involves the preparation of emulsion vinyl chloride homo- and copolymers which possess a combination of properties adapting them to the fabrication of plastic articles by various molding techniques known in the art.

With regard to the initiator system employed in the process, any Redox initiator system generally may be used. At present, a hydrogen peroxide-alkali metal formaldehyde sulfoxylate combination is preferred. Within this particular system, the amounts of hydrogen peroxide initiator and the alkali metal, e.g., sodium formaldehyde sulfoxylate activator used satisfactorily may be varied within relatively wide limits. The activator generally is employed to the extent of from about 0.003 to 3.0 percent, typically within the range of 0.01 to 0.05 percent, based on the weight of the monomer materials in the reaction charge. The amount of hydrogen peroxide that generally may be used is 0.002 to 3 percent of the total weight of the monomer charge. However, high conversions of monomer can be realized with minimum induction periods and normal polymerization cycles employing from 0.002 to 0.015 percent of hydrogen peroxide, and this percentage of initiator is preferred.

With regard to the emulsifier system of this invention, the primary surfactant employed generally may be any one of the alkali metal salts of sulfated fatty alcohols having from 8–18 C atoms per molecule. These sulfated fatty alcohol salts are commonly designated in the art as "alkyl sulfate surfactants" or as "fatty alcohol sulfates." Suitable compounds of this class include, for example, sodium caprylyl sulfate, sodium capryl sulfate, sodium lauryl sulfate, sodium tridecyl sulfate, sodium myristyl sulfate, sodium cetyl sulfate, and sodium stearyl sulfate. Also suitable are compounds otherwise similar to any of the foregoing fatty alcohol sulfates, but where sodium is replaced by potassium, calcium, barium, ammonium, or alkanol amines of up to six carbon atoms. Of these compounds, sodium lauryl sulfate is the presently preferred surfactant.

Employed essentially as a modifier for the surfactant system, and so designated herein, may be either tallow fatty alcohol (primarily a mixture of stearyl and cetyl alcohols) or an epoxidized unsaturated fatty acid oil, e.g., epoxidized soybean oil. Such a compound is designated chemically as an epoxidized fatty acid triglyceride. These components serve to provide, in combination with the primary surfactant, the desired rheology properties in the resin product. The excellent surface gloss properties of moldings fabricated from the resin likewise can be attributed largely to the modifying component.

As an additive to the emulsion polymerization system of this invention, there is employed certain adducts of ethylene glycol which are normally prepared commercially by the controlled addition of ethylene oxide to the glycol at high pressures and reaction temperatures. At least some of these materials may also be formed as by-products in the manufacture of ethylene glycol at low pressure. These ethylene oxide adducts of ethylene glycol which are completely soluble in water may be represented broadly by the structural formula:

$$HO(CH_2CH_2O)_nH$$

wherein $n$ is an integer of 2 to 12, inclusive. Specific glycol adducts suitably employed include diethylene glycol, triethylene glycol, and those commercially available polyethylene glycols having an average molecular weight of up to 600.

In use, the particular glycol adduct employed does not, as expected, provide any post-stabilization of the polymerization latex, since none of the glycol adducts suitably employed herein are emulsifiers per se, nor are they regarded as emulsifiers in the art. Rather, in the process of this invention, the glycol adduct is believed to combine with the residues of the emulsifier system in such a manner that the hydrophilic character of these residues is suppressed to a significant degree. Use of the glycol derivatives provides minimum moisture-sensitivity to the paste resin product with no deleterious effects to its air-release properties. Of equal importance is the fact that the glycol derivatives will not spew, plate out, or be otherwise exuded from the product during its use in various applications.

The amounts employed of the foregoing described components of the emulsifier system are somewhat critical for obtaining a paste resin product exhibiting all of the desired properties. Accordingly, quantities of the ingredients are carefully selected so as to maintain stability in the latex, while simultaneously inhibiting excessive micelle formation therein, which, in turn, could produce a resin product of unsatisfactory average particle size and undesirable plastisol rheological properties. Further, the amount added of the ethylene glycol derivative is critical for effecting the desired air-release properties and negligible moisture-sensitivity of the resin product, while not adversely affecting its thermal stability.

Accordingly, the primary surfactant is employed in an amount ranging from about 0.05 percent to 3.0 percent, preferably from 0.1 percent to 1.5 percent, based on the weight of the monomer charge; and the surfactant modifier is used in an amount ranging from 0.05 percent to 2.0 percent, preferably from 0.1 percent to 1.5 percent, based on the rate of the monomer charge. The ethylene glycol adduct is employed in an amount ranging between 0.05 percent to 3 percent, preferably from 0.2 percent to 2 percent, based on the total weight of the monomer charge.

Aside from the emulsifier system and the glycol adduct employed, the process of this invention is conducted essentially by methods known in the art for carrying out aqueous emulsion polymerization processes. The water to monomer ratio employed varies typically from 1.5 to 2.5:1, with a water to monomer ratio of 1.7 to 2.0:1 being preferred. The polymerization temperature ranges generally from 100° F to 160° F, with temperatures between 110° F and 140° F being preferred. The process is carried to substantial completion in run times of 2½ to 20 hours, depending upon the reaction conditions employed.

The paste resin products of the process of this invention exhibit a combination of properties which make them especially adaptable as molding resins, particularly by rotational molding and slush molding techniques. These products are characterized by excellent gloss, optimum clarity and negligible moisture-sensitivity. Being prepared in many instances from reactants which are FDA-approved, they may be employed in applications for subsequent contact with foodstuffs. For example, a specific additive of this invention, triethylene glycol, has, at present, complete clearance under FDA Reg. 121.2550 by cross reference to Reg. 121.2514 for use in sealing gaskets in closures for food containers. Of utmost importance is the fact that the finished paste resin products of this invention contain minimum quantities of residual emulsifiers or soaps. Accordingly, they exhibit excellent stability against degradation upon exposure to elevated temperatures during processing.

As indicated hereinabove, the preferred monomer is vinyl chloride. However, copolymers may be advantageously prepared in accordance with this invention. For example, copolymerizable mixtures, containing vinyl chloride and up to 49 percent vinyl acetate, but preferably in the range of 5 to 10 percent vinyl acetate, may be employed. Other monomers copolymerizable with vinyl chloride, which may be used in accordance with this invention, include esters of other alkanoic acids such as vinyl propionate, vinyl butyrate, and the like; vinyl esters of aromatic acids, e.g., vinyl benzoate; esters of alkenoic acids, for example, those of unsaturated monocarboxylic acids such as methyl acrylate, ethyl acrylate, allyl acrylate, 2-ethyl hexyl acrylate, and the corresponding esters of methacrylic acid; and esters of 1,$\beta$-dicarboxylic acids, for example, the methyl, ethyl, propyl, butyl, amyl, hexyl, heptyl, octyl, allyl, methallyl, and phenyl esters of maleic, itaconic, fumaric acids, and the like. Amides, such as acrylamide and methacrylamide, and nitriles, such as acrylonitrile, may also be suitably employed.

The following examples are given in order that those skilled in the art may more completely understand the invention and the preferred methods by which the same may be brought into effect. In these examples and elsewhere herein where proportions of ingredients are given in parts, such proportions are by weight.

EXAMPLE 1

A. Preparation of Polymer Seed Latex

A suitable polymer seed latex is prepared, utilizing the following materials:

| | |
|---|---|
| Deionized water | 21 gals. |
| sodium formaldehyde sulfoxylate | 0.022 lb. |
| Sodium lauryl sulfate | 0.022 lb. |
| Vinyl chloride monomer | 100 lbs. |
| Hydrogen peroxide | 0.008 lb. |
| Sodium lauryl sulfate | 1.00 lbs. in 3 gals. of water |

The water, at ambient temperature, is delivered to a 50-gallon reactor, after which the sodium formaldehyde sulfoxylate and the 0.022 lb. portion of sodium lauryl sulfate are added and thoroughly mixed with the water by agitation. The reactor is closed, held under vacuum for a short time, and subsequently purged with vinyl chloride to displace the air. The monomer is then charged to the reactor, the temperature of which is then raised, with continuous agitation, to about 110° to 125° F and to a pressure equivalent to the vapor pressure of the monomer at these temperatures (about 90 to 140 psig). A portion of the hydrogen peroxide is added to initiate the reaction, and the balance is added slowly to maintain the reaction rate. Shortly after polymerization has been initiated, addition of the sodium lauryl sulfate aqueous solution is begun and continued slowly throughout the reaction cycle. When the reaction has been completed (noted by a pressure drop of 20 to 40 pounds), the remaining monomer is stripped off. In this example, the reaction time is about 4 hours. The contents of the reactor comprise a polymer seed latex, containing approximately 28 to 30 percent solids, by weight.

B. Preparation of Molding Paste Resin Product

Following the same general procedure as outlined in Part (A) of this example, similar quantities of deionized water, sodium formaldehyde sulfoxylate, 0.022 pound of sodium lauryl sulfate, 0.22 pound of tallow fatty alcohol, and 8 pounds of the polymer seed latex prepared in Part (A) above are charged to the reactor. The vinyl chloride monomer is added after the reactor has been evacuated and purged with vinyl chloride. Of the total amount of hydrogen peroxide used (0.008 pound), a portion is added initially to the reaction and the balance is added incrementally to maintain the reaction rate. When polymerization has been initiated, a solution of 0.4 pound of sodium lauryl sulfate in 3 gallons of water is slowly metered into the reactor throughout the reaction cycle. When the polymerization is completed (reduction of 20–40 pounds in reactor pressure), 0.8 pound of triethylene glycol is added to the reactor with agitation, after which agitation of the reactor contents is continued for at least 15 minutes prior to stripping excess monomer from the reactor.

The polymer latex (containing about 32 percent solids) is recovered, spray-dried, and then ground to yield particulate vinyl chloride paste resin.

A plastisol is prepared using 60 parts bis(2-ethyl hexyl phthalate) plasticizer for each 100 parts of the dry resin product. Mixing of the ingredients is carried out in a Hobart Mixer for 15 minutes at 25° C.

The viscosity characteristics of this plastisol at low shearing stress are measured at 25° C, using a Brookfield Viscometer (Model RVT-200) with the No. 5 spindle, at 5 rpm. Results are as follows:

| Plastisol sample | viscosity-centipoises |
|---|---|
| Aged 2 hours | 12,600 |
| Aged 24 hours | 16,000 |

These values indicate that a paste resin product of this invention provides plastisols which exhibit good flow properties at low shear, both shortly after being prepared and after aging.

To determine the dispersion viscosity characteristics of the paste resin product of this example at high shearing stress, the viscosity of a 2-hour aged plastisol, prepared as described hereinbefore, is measured at 25° C, using a Severs Extrusion Rheometer (Model A–100) with a medium-sized orifice (0.3 centimeter diameter). Results are as follows:

| psig | Viscosity-poises |
|---|---|
| 100 | 99 |

These values indicate that a paste resin product of this invention provides plastisols with good rheology at high shearing stress.

To determine the air-release properties of the plastisol, a 10 g sample of freshly prepared material is poured into a 250-ml beaker, to which vacuum is then applied. The height of the foam layer which develops is measured prior to breaking. Using this procedure, a foam layer of only 2.0 cm develops prior to being broken with release of the entrapped air. By comparison, a foam layer of approximately 3.5 cm develops prior to breaking in a similar plastisol formulation of a commercial paste resin product widely used in molding processes.

The heat stability of the paste resin product is determined employing the following formulation:

| | |
|---|---|
| Resin | 100 parts |
| Bis(2-ethyl hexyl phthalate | 60 parts |
| G-62* | 5 parts |
| Stabilizer** | 3 parts |

*PARAPLEX G-62 - Epoxide Plasticizer (Rohm and Haas)
**Stabilizer 6V6-A Liquid Ba-Cd-Zn Complex (Harshaw Chemical)

This formulation is thoroughly blended in a Hobart Mixer, after which the resulting plastisol is deaerated under vacuum. Portions of the plastisol are poured into a sectional tray mold, which is then placed in a circulating-air oven maintained at 375° F. Fused samples are removed from the oven after 20, 30, and 47 minutes exposure. Using this procedure, no significant coloration is observed even in the fused sample which is heated for 47 minutes at 375° F.

A portion of the plastisol prepared for the foregoing heat stability test is drawn to a 30-mil film on a glass plate, and is fused by heating in the air-circulating oven for 5 minutes at 350° F. After being cooled, the gloss properties of the film surface are determined with a photovolt gloss meter, utilizing a 60° measuring head and a polished black Carrara glass plate as working standard. Using this procedure, the surface of the film prepared from the resin product of this example exhibits a gloss rating which is 100 percent of the standard.

For determination of humidity aging characteristics, quantities of the dry resin product are stored under varying humidity conditions for at least 24 hours. After the storage period, plastisols are prepared as described above from each resin sample. Viscosities of these plastisols are then determined as before, after being aged for 2 hours and 24 hours. Results are as follows:

PLASTISOL VISCOSITY-CENTIPOISES

| Plastisol sample | Resin stored at 50% R.H.* | Resin stored at 100% R.H. | % Reduction in viscosity |
|---|---|---|---|
| Aged 2 hours | 12,600 | 12,600 | 0 |
| Aged 24 hours | 16,000 | 14,200 | 11.2 |

*Relative Humidity

As indicated, no difference in viscosity readings is observed for either plastisol after 2-hour aging, although prepared from resins stored for some time under different humidity conditions. After 24-hour aging, the plastisol prepared from the resin previously stored at 100 percent relative humidity shows a viscosity reduced only 11.2 percent from that of a similarly aged plastisol containing resin previously maintained under 50 percent relative humidity conditions. A plastisol rheology reduction due to moisture pickup during storage of the resin is an indication of the resin's "moisture-sensitivity." Extremely high shifts (or reductions) in plastisol rheology are undesirable as they create severe problems in molding operations and also in other types of finishing techniques. Paste resins that provide plastisols which exhibit rheology reductions of up to 25 percent are considered very satisfactory for commercial application.

For comparison purposes, two commercial polyvinyl chloride dispersion resins adaptable for molding applications were successively stored, dispersed in plasticizer, aged, and plastisol viscosity readings obtained as described hereinabove, with the following results:

Plastisol Viscosity-Centipoises

| Plastisol Sample | Resin Stored at 50% R.H.* | Resin Stored at 100% R.H. | % Reduction in Viscosity |
|---|---|---|---|
| EXON 654 (Firestone Plastics Co.) | | | |
| Aged 2 hours | 10,400 | 5,600 | 46.2 |
| Aged 24 hours | 16,400 | 5,900 | 64.0 |
| GEON 121 (B. F. Goodrich Chem. Co.) | | | |
| Aged 2 hours | 14,700 | 11,200 | 23.8 |
| Aged 24 hours | 16,000 | 11,600 | 27.5 |

*As described previously.

These results indicate that these commercial resins are more moisture-sensitive than the paste resin product of this example, as evidenced by the greater differences observed between the viscosity readings of plastisols prepared from resin samples stored at 50 percent relative humidity and those stored at 100 percent relative humidity.

EXAMPLE 2

Using the same general procedure and polymerization recipe as set forth in Example 1, Part (A) above, a polymer seed latex is prepared.

Eight pounds of the polymer seed latex prepared is incorporated in the formulation as outlined in Example 1, Part (B), and preparation of the paste resin product is carried out exactly as described previously. When polymerization is complete, 0.2 pound of polyethylene glycol 200 is added to the reactor with agitation, followed by stripping of excess monomer. Particulate polymer product is recovered as set forth in Example 1.

This paste resin has the following dispersion rheologies determined as previously described:

| | | |
|---|---|---|
| plastisol viscosity (Low Shear) | 2-hour aging (50% R.H. storage) | 8,700 cps |
| | 2-hour aging (100% R.H. storage) | 7,000 cps |
| | A shift (reduction) in aged viscosity of 19.5% is observed. | |
| severs viscosity (High Shear) | 100 psig | 82 poises |
| | 60 psig | 90 poises |

The heat stability of the resin and gloss characteristics of moldings prepared therefrom are equivalent to the resin product of Example 1. As an indication of air-release properties, a plastisol of this resin product develops a foam layer 2.0 cm in height prior to breaking.

For comparison purposes, other paste resin products were prepared as previously described in this example.

When the polymerizations were complete, a prescribed amount of polyethylene glycol 200 monolaurate (200 = molecular weight of esterified polyethylene glycol) was added to each reactor as indicated in the table below. This material, chemically a polyethylene glycol monoester, is recognized in the art as being one of the polyethylene glycol series of emulsifiers.

After recovery of the particulate polymer products, these paste resins were found to have the following 2-hour aged dispersion rheologies under varying humidity conditions:

Plastisol viscosity-centipoises

| % Additive/By Wt of Monomer | Resin Stored at 50% R.H.* | Resin Stored at 100% R.H. | % Reduction in Viscosity |
|---|---|---|---|
| 0.5 | 18,600 | 5,800 | 68.8 |
| 1.0 | 13,900 | 5,400 | 53.95 |

*As described previously.

As the above results indicate, paste resins prepared employing the polyethylene glycol fatty acid ester as additive are significantly more moisture-sensitive than those prepared according to the process of this invention in which an ethylene glycol adduct is employed as additive.

The paste resin products from those runs above incorporating the polyglycol esters exhibited markedly poor heat stability by comparison to paste resin products of this invention. Also, plastisols of the polyethylene glycol ester-containing resins each developed a foam layer of at least 8.0 cm in height prior to breaking.

EXAMPLE 3

A paste resin product is prepared following the same general procedure as outlined in Example 1, Parts (A) and (B), and employing the same polymerization recipe with the exception that, in this example, 0.95 pound of diethylene glycol is employed as the additive in place of triethylene glycol.

The moisture-sensitivity of the resin product is found to be within the limits for commercial acceptance, as the aged viscosity of a plastisol made with resin stored at 100 percent relative humidity is only 25 percent lower than that prepared from resin stored under 50 percent relative humidity conditions.

The air-release properties and heat stability of this resin are equivalent to the product of Example 1.

EXAMPLE 4

A paste resin product is prepared as described in Example 1 (Parts A and B), except that 0.22 percent, based on the monomer charge, of epoxidized soybean oil is substituted for the tallow fatty alcohol employed in Example 1.

After addition of the triethylene glycol additive, the latex is spray-dried and ground. The resulting paste resin product exhibits 24-hour Brookfield rheologies (low shear) of 10,000 centipoises, high shear rheologies (100 psig) of 68 poises and an air-release value of 2.5 cm, determined as previously described.

EXAMPLE 5

Following the general procedure and polymerization recipe as outlined in Example 4, a paste resin product is prepared. In this example, however, 0.25 pound of "polyethylene glycol 600," based on the monomer weight, is employed rather than triethylene glycol. The finished resin product is recovered as previously described.

Separate portions of the product are aged at 50 percent and 100 percent relative humidity, after which plastisols are prepared from the stored resins as previously described. Aged viscosity readings obtained on these plastisols are as follows:

PLASTISOL VISCOSITY-CENTIPOISES

| Plastisol sample Aged 24 hours | Resin stored at 50% R.H. | Resin stored at 100% R.H. | % Reduction in Viscosity |
|---|---|---|---|
| | 9,500 | 8,400 | 11.6 |

Thus, the resin product of this example is found to possess minimal moisture-sensitivity. The air-release value is 1.7 cm.

It is to be noted that a paste resin prepared according to the procedure outlined herein but without the addition of the polymeric glycol derivative is extremely moisture-sensitive. Upon being aged under 50 and 100 percent relative humidity conditions and then formulated in plasticizer, the plastisol prepared from the resin stored at the higher humidity, with only 2 hours aging, gives a viscosity reading which is 70 percent reduced from that of the plastisol containing the resin stored at 50 percent relative humidity. Stated in another manner, this resin exhibits 70 percent "moisture-sensitivity."

EXAMPLE 6

Alcohol extraction tests were conducted as follows on the paste resin product of Example 1 and some commercially available vinyl chloride paste resins which are normally used for molding applications:

For each test, a 12-gram sample of resin was weighed into an extraction thimble of a Soxhlet extraction apparatus, after which 100 ml of methanol was poured into the tared solvent flask. The apparatus was assembled and the extraction temperature adjusted to produce at least 6 solvent exchanges per hour. After 6 hours at temperature, the solvent flask was removed and slowly evaporated to dryness over a steam bath. When all apparent solvent had been evaporated, the flask was heated in a 105° C oven, with weighing at periodic intervals, until constant weight was reached. The amount of residue extracted was determined by difference between the final weight of the flask and contents and the tare weight of the flask. The percentage of extractable materials was then calculated based on the initial resin weight. The following average results were obtained:

| Resin | % MeOH Extractables |
|---|---|
| Product of Example 1 | 1.33 |
| EXON 654 (1) | 2.81 |
| GEON 121 (2) | 3.47 |
| OPALON 410 (3) | 3.52 |
| VINYLITE QYLF-2 (4) | 4.93 |

(1) Firestone Plastics Company
(2) B. F. Goodrich Chemical Company
(3) Monsanto Chemical Company
(4) Union Carbide Corporation As these results show, the paste resin product of this invention contains a significantly lower percentage of methanol extractables than any of the commercially available paste resin products tested. This property can become especially important when considering the possible end-uses of the paste resin of this invention. In molding applications, the reduced soap and additive residues in the resin assures, for example, the absence of plate-out problems on the molds and also minimal contamination of the product with polymerization residues. Most important, the emulsifying components of the polymerization system of the present invention have been sanctioned by the FDA for use as closures for food containers. Thus, the paste resin product may be safely utilized for molded articles in contact with foodstuffs. These paste resins, however, are useful for other applications such as in the production of coatings of high gloss and clarity and for foam products of excellent cell structure.

It is to be understood that although the invention has been described with specific reference to particular embodiments thereof, it is not to be so limited, since changes and alterations therein may be made which are within the full intended scope of this invention as defined by the appended claims.

We claim:

1. A process for preparing a paste-forming polymer adapted to molding applications from a monomer selected from the group consisting of vinyl chloride and mixtures thereof with at least one other monomer polymerizable therewith which process comprises sequentially A. polymerizing said monomer in an aqueous medium in the presence of a free-radical initiator system and, as the emulsifier system, a mixture of from 0.05 percent to 3 percent of an alkali metal salt of a sulfated fatty alcohol of 8–18 C; and from 0.05 percent to 2 percent of a compound selected from the group consisting of tallow fatty alcohol and an epoxidized fatty acid triglyceride, the percentages of said components of the emulsifier system being based on the weight of monomer;

B. blending into the polymerization mixture upon substantial completion of the polymerization reaction from 0.05 percent to 3 percent, by weight of monomer, of a water-soluble ethylene oxide adduct of ethylene glycol having the general formula $$HO(CH_2CH_2O)_nH$$

wherein $n$ is an integer of 2 to 12, inclusive; and

C. finally spray-drying the polymerization mixture to recover the paste-forming polymer in particulate form.

2. The process of claim 1 wherein from 0.002 percent to 3 percent, by weight of the monomer, of hydrogen peroxide and from about 0.003 percent to 3 percent, by weight of the monomer, of an alkali metal formaldehyde sulfoxylate are employed as the initiator system.

3. The process of claim 1 wherein the reaction temperature is within the range of 100° F to 160° F.

4. The process of claim 1 wherein the alkali metal salt of a sulfated fatty alcohol of 8–18 C atoms is sodium lauryl sulfate.

5. The process of claim 1 wherein tallow fatty alcohol is employed.

6. The process of claim 1 wherein the water-soluble ethylene oxide adduct of ethylene glycol employed is triethylene glycol.

7. The process of claim 1 wherein the water-soluble ethylene oxide adduct of ethylene glycol employed is a polyethylene glycol having an average molecular weight of up to 600.

8. The process of claim 1 wherein the monomer is a mixture of vinyl chloride with up to 50 percent, by weight of the mixture, of at least one other monomer copolymerizable with vinyl chloride.

* * * * *